United States Patent [19]
Burnett

[11] 3,958,994
[45] May 25, 1976

[54] PHOTOSENSITIVE DIAZO STEEL LITHOPLATE STRUCTURE

[75] Inventor: Leo S. Burnett, Summit, N.J.

[73] Assignee: American Hoechst Corporation, Bridgewater, N.J.

[22] Filed: Aug. 26, 1974

[21] Appl. No.: 500,570

[52] U.S. Cl. .................. 96/75; 96/33; 96/86 P; 101/456; 101/458; 427/431; 427/433; 29/196.2; 29/196.5
[51] Int. Cl.² ............... G03F 7/08; G03C 1/94; G03C 1/52
[58] Field of Search ............ 96/75, 86 P, 33; 101/456, 459, 458; 29/196.2, 196.5; 117/114 A, 114 C, 131; 427/431, 433

[56] References Cited
UNITED STATES PATENTS

| 951,103 | 3/1910 | Cornwall | 101/459 |
|---|---|---|---|
| 2,214,950 | 9/1940 | Aller | 101/459 |
| 2,697,039 | 12/1954 | Martinson | 96/33 |
| 2,994,609 | 8/1961 | Landau | 96/33 |
| 3,197,308 | 7/1965 | Stahlhofer | 96/33 |
| 3,201,239 | 8/1965 | Neugebayer et al. | 96/75 |
| 3,220,832 | 11/1965 | Uhlig | 96/75 |
| 3,343,930 | 9/1967 | Borzillo et al. | 117/114 A |
| 3,348,948 | 10/1967 | Leonard et al. | 96/33 |
| 3,393,089 | 7/1968 | Borzillo et al. | 117/114 C |
| 3,679,419 | 7/1972 | Gillich | 96/75 |
| 3,865,595 | 2/1975 | Watkinson | 96/33 |

FOREIGN PATENTS OR APPLICATIONS

| 936,913 | 9/1963 | United Kingdom | 101/458 |
|---|---|---|---|
| 2,012,288 | 10/1971 | Germany | 101/458 |

Primary Examiner—Charles L. Bowers, Jr.
Attorney, Agent, or Firm—James E. Bryan

[57] ABSTRACT

A lithographic printing plate structure and method of manufacture, in which a support sheet of steel, normally subject to corrosion in a lithographic environment, such as a mild steel, is coated, preferably on both sides, with aluminum, zinc or an aluminum-zinc alloy to a thickness of about 1 to 3 mils, a polyvinyl phosphonic acid is disposed on the metal coating and a negative working diazo photo-sensitive layer is applied over the polyvinyl phosphonic acid coating.

3 Claims, No Drawings

PHOTOSENSITIVE DIAZO STEEL LITHOPLATE STRUCTURE

FIELD OF THE INVENTION

This invention relates to new lithographic printing plates. More specifically, the present invention relates to negative working lithographic printing plates.

BACKGROUND OF THE INVENTION

The preparation of lithographic printing plates is well-known in the art. The field of photolithography is discussed in "Light Sensitive Systems", by Jaromir Kosar, John Wiley & Sons, Inc., New York, 1965 (particularly in Chapter 3, Section 3.7) which discusses surface plates, deep etch plates, bi-metallic and tri-metallic plates, and plastic and paper lithoplates. Other sections of this book discuss in great detail the chemistry of photosensitive systems and, to the extent that they refer to photosensitive coatings and their application to a support, are also pertinent to the present invention.

Initially, lithographic printing was done with stone, but subsequently a great variety of materials have been used for supports. Thick zinc sheets have been popular which, because of their high cost, were reused many times after printing. For reuse the image was stripped and the surface of the plate cleaned and regrained laboriously. While zinc is still in use, aluminum is used in most plates and the trend has been to thinner sheets which are used but once and then discarded to realize savings in labor costs. Bi-metal and tri-metal plates are also used. Bi-metal plates are prepared by laminating or electroplating copper upon either stainless steel or aluminum of sufficient thickness to act as a practical support. The copper surface is coated with a photosensitive material which functions as a photoresist. After imaging and developing, the unprotected copper is etched away down to the level of the stainless steel or aluminum support. The photoresist is next stripped away, the copper is activated to make it oleophilic and the support metal is made hydrophilic by treatment with a gum solution, whereupon a printing plate ready for the press has been prepared. Such plates are known to have great run lengths.

Similarly, tri-metal plates are used, in which chromium is clad upon copper which, in turn, is clad upon a support metal. In this case, the support metal functions in a support capacity only and the image is in the copper (oleophilic) and the non-image is chromium (hydrophilic).

Tri-metallic and bi-metallic plates, as can be seen from the recitation of the necessary steps of preparation, are, despite their virtues, time consuming in preparation.

Newer developments have been in the use of aluminum sheet which is presensitized at the factory, the latest types of which are known as subtractive plates wherein a photosensitive coating combines sensitizing agent, pigment or dye with resin. After exposure and simple development, the resulting image has good thickness, a visible image and great resistance to press wear. The operations required to make such a plate after the exposure are no more than two (development followed by finishing) or more recently, only one, when a combined developer/finisher is used. Such plates offer high run lengths and great convenience to the user.

All of the aluminum and zinc plates previously described suffer from the disadvantage that, to be affixed satisfactorily to the plate cylinder of the printing press, they must be bent at either end and inserted into slots and carefully clamped on the cylinder. The plates representing the different colors in multi-color printing are particularly problematic since they must be carefully aligned to place them into register. The act of bending and clamping often causes plate failure due to metal fatigue, usually during longer press runs.

Speed in placing and removing plates on plate cylinders is particularly desirable in newspaper publishing, where operating speed is required, and for this reason letterpress plates on magnetic steel supports have been developed which adhere firmly to plate cylinders into which strong permanent magnets have been embedded. These are, however, letterpress plates. Some of the bi- and tri-metallic plates described above could be used on magnetic cylinders to gain the advantages of speed in placement and removability, if the stainless steel used could be of the magnetic variety. However, bi- and tri-metallic plates, as already described, suffer from the disadvantage of initial cost and further cost due to the numerous process steps required and additional time required for their preparation.

Entirely apart from their incapability of use in magnetic cylinder applications, the popular and convenient aluminum based plates suffer the further disadvantage of cost in manufacture because of the base metal employed, namely aluminum. Aluminum, as is well-known in its refinement from its ores, requires more energy than any other important metal and certainly much more so than steel so that this is a component of its cost which cannot be overcome unless someone is successful in extracting aluminum metal by non-electrolytic techniques. A search of the literature reveals no such prospects of accomplishing this at the present time.

Another disadvantage of aluminum, aside from cost, is its softness and ductility. Unless prohibitive thicknesses are used, great care must be taken in handling aluminum plates to prevent creases or dimples, which cannot be flattened once creased and which make a fully processed plate useless.

The desirability of using a steel plate, because of its greater strength than aluminum, its lower cost than aluminum and to take advantage of its utility as a magnetic material, has long been known. However, it has not been possible to employ steel for this purpose because of the speed with which steel corrodes in air and in contact with press chemicals and, even more seriously, because coatings of photosensitive materials, primarily diazos, upon steel suffer rapidly from dark reaction which makes them worthless as presensitized plates because of lack of storage stability.

Plain steel sheet has been considered for plates because of availability and lower cost, but has found no place in the art because of its severe corrosion problems.

Corrosion is a problem in steel for any use. However, in lithographic printing plates, it cannot be tolerated at all. There is voluminous literature on the protection of steel from corrosion by phosphating, passivating, coating and painting, but such treatments do not result in a suitable carrier for presensitized printing plates. In fact, most known treatments render the steel totally unsuitable as a lithographic carrier.

It is the object of this invention to demonstrate how, quite unexpectedly, the shortcomings mentioned above can be overcome. A more specific object is to teach how to prepare a steel carrier for use as a presensitized plate, which, in turn, can then be used on magnetic plate cylinders. It is another object of this invention to thereby prepare a presensitized metal plate which is inherently cheaper than the popular aluminum-based presensitized plates and for that matter any of the bimetallic and tri-metallic plates known today. It is a further object of the invention to prepare a plate which is more durable and crease resistant than an aluminum plate. Yet another object of this invention is to provide a plate which will have good dimensional stability, which is not obtainable in any plastic-or paper-based plate.

SUMMARY OF THE INVENTION

This invention comprises the use of aluminum, zinc, or an aluminum/zinc alloy coated steel, normally subject to corrosion in a lithographic environment, such as mild steel, as a support carrier for a lithographic printing plate combined with a unique pretreatment which acts not only as a very effective corrosion inhibitor but also as an excellent barrier layer and adhesion promoter for light sensitive diazo coatings of the type used in today's printing industry.

DETAILED DESCRIPTION OF THE INVENTION

The distinguishing feature of this invention is the successful use, for the first time, of highly corrodible steel sheet as a lithographic printing plate support. This is accomplished by starting off with a dip-coated or otherwise clad steel plate wherein the coating is either zinc or aluminum, or alloys of the two throughout the entire composition range from all aluminum to all zinc. The products and processes for making such coated steel sheet consisting essentially of 25% to 70% aluminum and 75% to 30% zinc are described more fully in U.S. Pat. Nos. 3,343,930 and 3,393,089 (Barzillo et al). All compositions of the metals are coatable upon steel. Corrosion resistance as compared to uncoated steel alone is thereby improved for all these compositions, however, such coating is not adequate to produce a presensitized printing plate. Nonetheless, some compositions appear to be better than others. It was thus found that steel clad with between 65% to 45% aluminum, 0.5 to 3.0% silicon and the balance zinc, appears to be superior to other alloys. The reason for this is not fully understood at this time.

The thickness of the metal or alloy coating also plays a part in the production of a suitable lithographic plate. In the useful range, a quarter mil thickness on each side is the minimum desirable thickness and this thickness can be easily extended to 3 mils. The preferred range is from 0.5 to 1.0 mils. The metal coatings of this invention, zinc/aluminum alloys particularly, provide cathodic protection in that the more active metal will dissolve before iron under corroding conditions. One such suitable alloy coating is 55% aluminum, 1.6% silicon and the balance zinc. It has 0.5 ounces per square foot of alloy coating on both sides, which corresponds to 0.75 mil in thickness on each side. Such sheet material is a product of the Bethlehem Steel Corporation and is called "Galvalume". While, in the description of the prior art above, it was noted that both pure zinc and relatively pure aluminum are well-known as lithographic printing plate support materials, it is not known, and was also unexpected, that alloys of the two would also prove to be suitable. Each metal has its individual characteristics and it could, therefore, be expected that, in combination, they would defeat the requirements for a suitable lithographic plate support.

In the practice of making a printing plate, it is usually necessary to take the carrier, in this instance the steel sheet coated on two sides, and prepare it properly for coating in order to make a suitable presensitized or wipe-on lithographic printing plate. It is, of course, evident that while the processes of cleaning, graining and preconditioning prior to coating are, in general, similar for all, there are technical differences as the alloy composition is changed and specific conditions must be found. However, establishment of such conditions can be readily accomplished by a skilled technician and this requirement is one which is accepted in the art.

Cleaning is necessary to remove mill oils and other impurities which settle on the surfaces during manufacture. Standard techniques such as vapor phase degreasing and acid or hot alkali cleaning are normally and conveniently used. After rinsing, the plate can be brushed, either dry or with a slurry of abrasive, blast grained, or liquid honed, or any of the various techniques well-known for imparting a slightly roughened surface may be used in order to provide better adhesion of the final photosensitive coating that is to be applied.

After washing to remove traces of abrasives from the graining operation, the light sensitive coatings are applied and, in some cases, a further treatment known as preconditioning is employed. Such preconditioning treatments may be those described by Mason, Canadian Pat. No. 427,626. However, plates prepared in this manner and even preconditioned plates did not render useful plates. Either the plates so prepared showed poor image adhesion or would not carry sufficient water during printing. Mostly, however, the light sensitive coatings applied thereon had poor shelf life. It is believed that the reason for the latter lies either in the continuing corrosion of mild steel or the diffusion of iron into the light sensitive coatings on storage, the latter being a known "poison" for such systems.

Quite unexpectedly, it was found that a pretreatment with polyvinyl phosphonic acid eliminates all the above problems by either, or in combination, suppressing or preventing further corrosion, suppressing or preventing the diffusion of the carrier constituents which cause rapid degradation of the light sensitive coatings or acting as a bonding layer to adhere the imaged coating to the base after exposure. One type of polyvinyl phosphonic acid found useful is described in German Pat. No. 1,125,658 (Koch et al) and German Pat. No. 1,135,176 (Rochlitz et al).

Photosensitive coatings found suitable for use in this invention are the negative working diazos. Examples of diazo coatings are given in U.S. Pat. No. 3,136,637 (Larsen) and U.S. Pat. No. 3,679,419 (Gillich) which are to be made part of this application by reference.

The practice of this invention can be best shown in detail in the following examples.

EXAMPLE I

A sample of Galvalume sheet supplied by Bethlehem Steel Company, 8 mils thick, and with the alloy coating described above was immersed for 30 to 45 seconds at 23°C in a 4% solution of Ridoline 35 (proprietary alkaline cleaning compound of Dart Industries). After immersion, the plate was removed and washed with a tap water spray at room temperature for 5 to 10 seconds.

Following this, the wet plate was hand scrubbed with a graining brush using quartz abrasive and additional tap water for 30 to 45 seconds after which the abrasive grains were rinsed away with a tap water spray rinse. The plate was next immersed in a polyvinyl phosphonic acid solution (referred to above) and then water rinsed. Following the rinse, the plate was dried 15 to 20 seconds at 100°C.

A photosensitive coating from U.S. Pat. No. 3,679,419 (Gillich) was next applied by whirler coating at 90 rpm and 50°C for 2 minutes. The coating, so applied, was dried for 2 minutes at 100°C. The plate had a fairly uniformly coated appearance, typical of the process. Exposure was next made under a negative transparency for 2 ½ minutes using a Nu-arc Model FT - 40 Astro Mercury Exposure Device. The plate was developed with Enco Subtractive Developer, a product of American Hoechst, using the standard developing procedure at room temperature for 30 seconds. The plate was then rinsed, squeegeed, and treated with Enco brand Subtractive Finisher, a product of the American Hoechst Corporation, for 30 seconds at room temperature. The normal processes of inking, rinsing and gum preserving were then followed. No scum was observed upon the inking test. An excellent image was formed showing that the photosensitive coating adhered well in the image areas and was completely removed in the non-image areas, an absolute necessity for a usable lithographic printing plate. Upon testing on press, many impressions were obtained all free of press defects and with excellent clarity.

An unexposed presensitized plate, prepared in accordance with this example, was next subjected to an accelerated high temperature storage test for 4 hours at 100°C. Repetition of the steps of exposure, development and inking were completely successful. There was no trace of scum. This indicated the complete suitability of the plate and the fact that corrosion had not taken place and was not influential in deteriorating the plate, as is well-known with steel plate not prepared as in this invention.

EXAMPLE 2

A sample of Galvalume sheet was cleaned, grained, and coated exactly as in Example 1, except that the polyvinyl phosphonic acid treatment was omitted. After development and inking, the background scummed, showing the need for the polyvinyl phosphonic acid treatment to prevent deterioration of diazo sensitizer in non-image areas.

EXAMPLE 3

The steps of Example 1 were followed except that 4% acetic acid was used as a cleaning agent at a temperature of 23°C. A bristle brush was rubbed over the surface of the plate while in contact with acetic acid for 30 to 60 seconds prior to rinsing. The procedure of Example 1 was followed for the remainder of the operations with results as good as those observed in Example 1. A 20 mil thick steel plate coated with about 1 mil of aluminum on both sides was used as the metal carrier sheet in this example. The plate was cleaned, grained and pre-treated as before and coated with the same coating solution. All results were satisfactory.

EXAMPLE 4

A 36 × 0.0085 inch thick roll of Galvalume steel was cleaned by using 4% Ridoline 35 (the material of Example 1), brush grained with quartz and preconditioned with polyvinyl phosphonic acid solution on an experimental processing line. Approximately 150 yards of this material were processed. A coating similar to the one of Example 1 was applied by machine. A plate from this trial was uniform in appearance. A cut sample of this plate material was exposed for 2 ½ minutes in the FT-40 NU-arc Astro Mercury Exposure Unit. It was developed for 30 seconds in Enco Subtractive Developer and press tested to give a press test of many impressions of excellent image quality and free of scum. A sample of the presensitized plate was stored for three and 4 hours, respectively, at 100°C and then processed and inked. After 3 hours of storage, the plate was clean, whereas after 4 hours a very slight scum was observed.

It will be obvious to those skilled in the art that many modifications may be made within the scope of the present invention without departing from the spirit thereof and the invention includes all such modifications.

What is claimed is:

1. A lithographic printing plate structure, comprising a support sheet of steel, normally subject to corrosion in a lithographic environment,
    a metallurgically bonded coating of aluminum-zinc alloy in which the alloy comprises about 25 to 70% aluminum and about 75 to 30% zinc, on at least one side of said sheet of steel, said coating having a thickness in the range of about 0.5 to 3 mils,
    a coating of a polyvinyl phosphonic acid directly on said coating,
    and, directly on said polyvinyl phosphonic acid coating, a photosensitive layer comprising a diazo compound which upon exposure to actinic light provides photo-hardened areas in the exposed areas of the layer, whereby upon development of the layer with a solvent only the unexposed areas are removed.

2. A structure in accordance with claim 1 wherein the steel is mild steel.

3. A structure in accordance with claim 1 wherein the metal coating is disposed on both sides of the sheet of steel.

* * * * *